US011507891B2

(12) United States Patent
Clark et al.

(10) Patent No.: US 11,507,891 B2
(45) Date of Patent: Nov. 22, 2022

(54) DETERMINING AVAILABILITY OF CONFERENCE ROOMS

(71) Applicant: Hewlett-Packard Development Company, L.P., Houston, TX (US)

(72) Inventors: Alexander Wayne Clark, Houston, TX (US); Kent E. Biggs, Tomball, TX (US); Robert C. Brooks, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 754 days.

(21) Appl. No.: 15/761,696

(22) PCT Filed: Feb. 18, 2016

(86) PCT No.: PCT/US2016/018537
§ 371 (c)(1),
(2) Date: Mar. 20, 2018

(87) PCT Pub. No.: WO2017/142541
PCT Pub. Date: Aug. 24, 2017

(65) Prior Publication Data
US 2021/0027208 A1 Jan. 28, 2021

(51) Int. Cl.
*G06Q 10/02* (2012.01)
*G06Q 10/10* (2012.01)
(52) U.S. Cl.
CPC ........... *G06Q 10/02* (2013.01); *G06Q 10/109* (2013.01)

(58) Field of Classification Search
CPC ............................. G06Q 10/02; G06Q 10/025
See application file for complete search history.

(56) References Cited

U.S. PATENT DOCUMENTS

| 8,352,296 | B2 | 1/2013 | Taneja |
| 2003/0103075 | A1 | 6/2003 | Rosselot |
| 2007/0162315 | A1* | 7/2007 | Hodges .............. G06Q 10/0631 705/7.12 |
| 2009/0112926 | A1 | 4/2009 | Parker, II et al. |
| 2009/0265280 | A1 | 10/2009 | Taneja et al. |
| 2010/0070314 | A1 | 3/2010 | Jethani et al. |
| 2011/0069141 | A1 | 3/2011 | Mitchell et al. |

(Continued)

OTHER PUBLICATIONS

S. K. Ghai, L. V. Thanayankizil, D. P. Seetharam and D. Chakraborty, "Occupancy detection in commercial buildings using opportunistic context sources," 2012 IEEE International Conference on Pervasive Computing and Communications Workshops, 2012, pp. 463-466, doi: 10.1109/PerComW.2012.6197536. (Year: 2012).*

(Continued)

*Primary Examiner* — Resha Desai
*Assistant Examiner* — Carter P Brockman
(74) *Attorney, Agent, or Firm* — HP Inc. Patent Department

(57) ABSTRACT

Examples disclosed herein provide the ability to determine the availability of a conference room. In one example, a computing device may determine whether there is a user present in a conference room, determine scheduling of the conference room, and illustrate, on a display outside the conference room, availability of the conference room.

14 Claims, 4 Drawing Sheets

(56) References Cited

U.S. PATENT DOCUMENTS

| | | | | |
|---|---|---|---|---|
| 2012/0075068 A1* | 3/2012 | Walker | ............... | G06Q 10/109 |
| | | | | 340/10.1 |
| 2012/0158203 A1* | 6/2012 | Feldstein | ............. | G06F 1/3231 |
| | | | | 713/320 |
| 2012/0299728 A1* | 11/2012 | Kirkpatrick | .......... | G08B 13/189 |
| | | | | 340/541 |
| 2014/0109210 A1 | 4/2014 | Borzycki et al. | | |
| 2014/0149519 A1* | 5/2014 | Redfern | ............... | H04L 65/403 |
| | | | | 709/206 |
| 2016/0209072 A1* | 7/2016 | Golden | ................... | F24F 11/62 |

OTHER PUBLICATIONS

Cisco System Inc ~ "About Smart+Connected Meeting Spaces" ~ Administrator Guide ~ May 2013 ~ 59 pages.

\* cited by examiner

DETERMINING AVAILABILITY OF CONFERENCE ROOMS

BACKGROUND

Utilizing a conference room for meetings, or scheduling meetings in the conference room, can be challenging task, particularly when users are looking to use the same conference room for different meetings.

DETAILED DESCRIPTION

Although a conference room may be scheduled in advance, issues may still arise, such as meetings running over into another scheduled meeting. There also remains the issue of a user outside the conference room wondering whether a meeting is currently being held in the conference room prior to entering the room. In addition, as the availability of users are constantly changing, scheduled meetings may end up getting canceled, leaving the conference room now available unawares to other users.

Examples disclosed herein provide the ability to schedule or utilize a conference room and avoid many of the issues described above. By utilizing motion sensing of users inside and outside the conference room, and displaying information outside the conference room related at least to such motion sensing, utilization of the conference room may be more streamlined. As will be further described, non-intrusive communication from outside the conference room may encourage more timely meetings and inform waiting users of meeting schedules. In addition, users may be able to utilize the conference room for more impromptu meetings by knowing on the display outside the conference room whether or not the conference room is reserved by someone else and for what time slots.

Figure 1A:
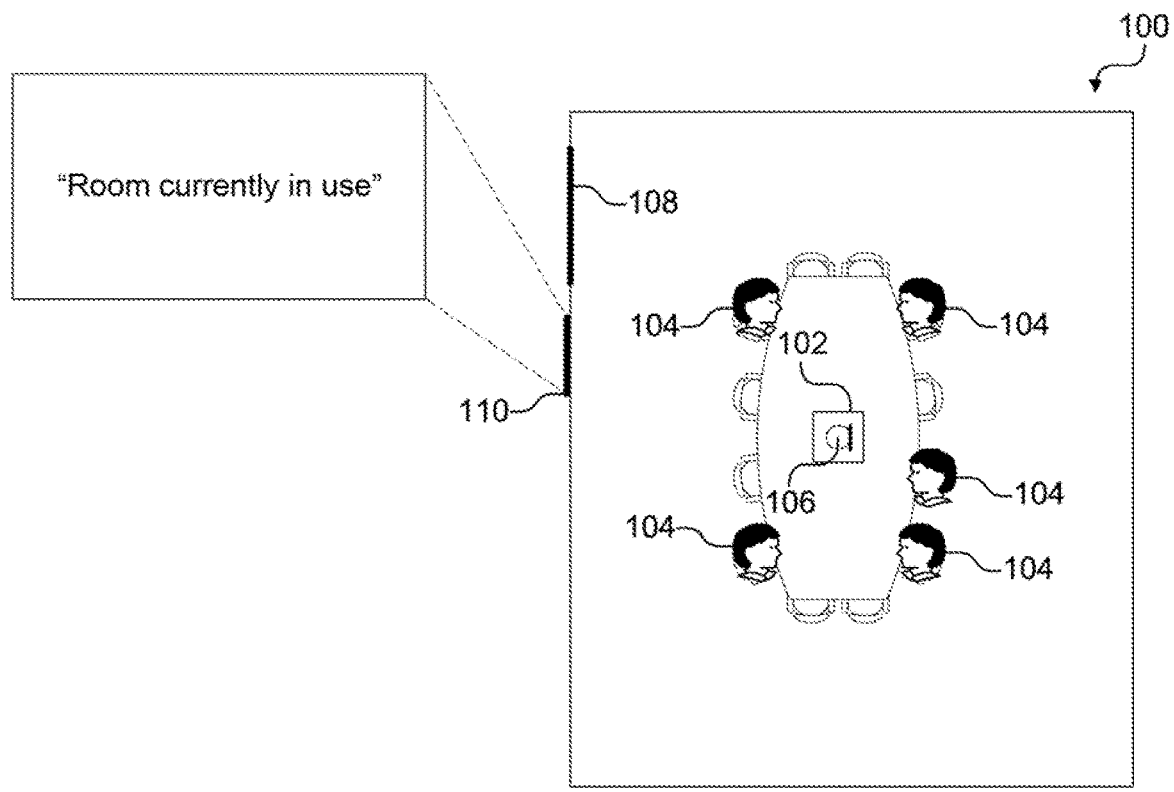
FIGS. 1A-B illustrate a conference room with notification of conference room occupancy on a display outside the conference room 100, according to an example.
Figure 1B:
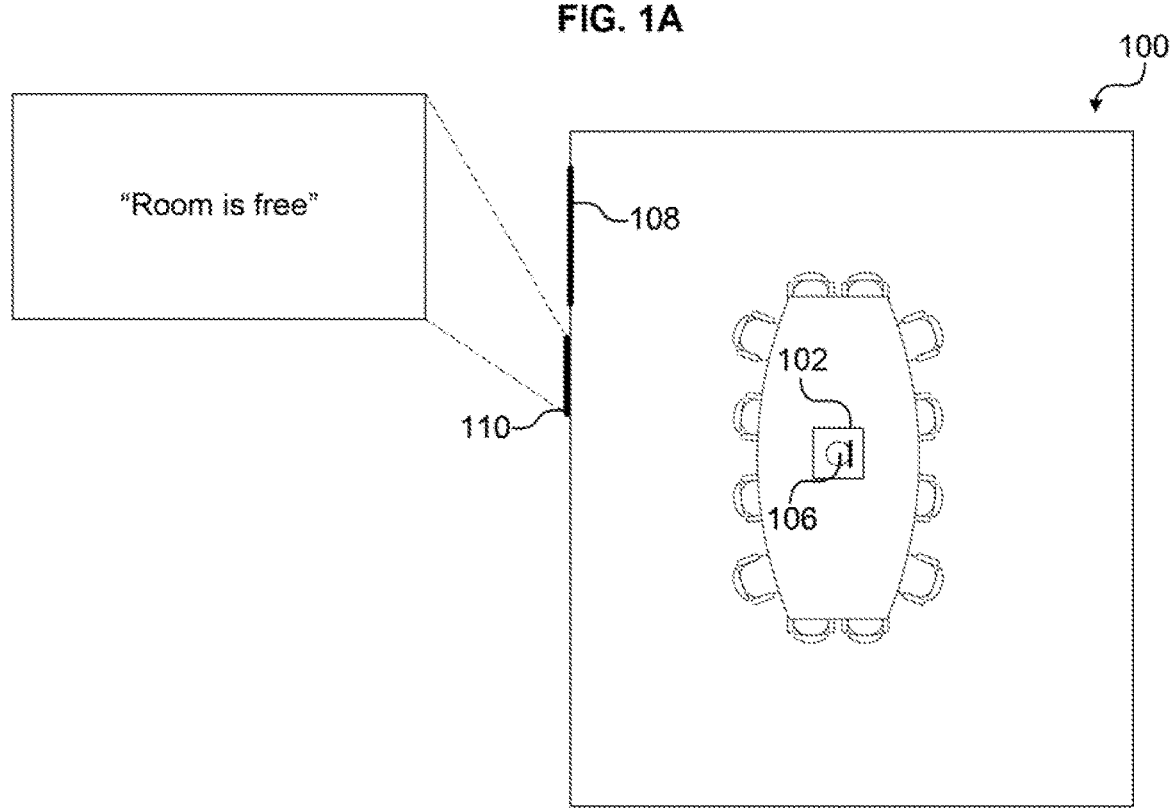

With reference to the figures, FIGS. 1A-B illustrate a conference room 100 with notification of conference room occupancy on a display 110 outside the conference room 100, according to an example. As an example, conference room occupancy may be determined by a motion sensor 106, such as a passive infrared (PIR) sensor. The motion sensor 106 may be positioned in the conference room 100 such that it can accurately determine occupancy throughout the conference room 100. Although only one motion sensor 106 is illustrated, multiple motion sensors may be utilized, for example, based on the size of the conference room 100. As an example, the motion sensor 106 can be part of a system and connected to a computing device 102 of the conference room 100, or be a fixed component of the computing device 102 (as illustrated). The motion sensor 106 can be connected to the computing device 102 with local wireless connectors and/or wires, or be all on the same network as an Internet of Things (IoT) solution. As used herein, "computing device" may be a remote web server, server, computer networking device, chip set, desktop computer, notebook computer, workstation, or any other processing device or equipment.

As an example, in addition to the motion sensor 106, the system can include other components of the conference room 100, including, but not limited to, lights, projectors, and the display 110 outside the door 108 of the conference room 100. The computing device 102 could be connected to other components as well, so that the various components can be configured by the computing device 102. By being connected to all of the components of the conference room 100, the components may be automated to turn on and off, based on conference room occupancy. For example, whenever the conference room 100 is unoccupied for a certain period of time (e.g., as detected by the motion sensor 106), components in the conference room 100 may be prompted to go into sleep mode. This may include the computing device 102 sending commands to the projectors, turning off all the lights, and putting the computing device 102 in a low power state. Once the motion sensor 106 detects a user 104 walking into the conference room 100, this detection may trigger waking the computing device 102 from its low power state, and the computing device 102 then turning on any necessary components to be used by the user 104. With the display 110 connected to the computing device 102, the computing device 102 may output information to be illustrated on the display 110, based on information obtained at least from the motion sensor 106, as will be further described.

Referring to FIG. 1A, multiple users 104 may gather around a conference table or move around in the conference room 100. Upon detecting when the first user 104 walks into the conference room, the motion sensor 106 may continue to monitor user presence or conference room occupancy by confirming whether any users 104 remain in the conference room 100. As an example, notification of room occupancy may be communicated on the display 110 outside the conference room 100. For example, the display 110 may use LED color notifications or an LCD display to indicate room occupancy. With regards to LED color notifications, a red color may indicate an occupied room and a green color may indicate an empty room. As an example, with regards to an LCD display, when the motion sensor 106 detects conference room occupancy, the display 110 may indicate that the room is currently in use, as illustrated.

As an example, in addition to indicating conference room occupancy, the computing device 102 may use the display 110 to provide additional useful information. For example, by having access to scheduling information regarding the conference room 100, the display may provide when a meeting is scheduled to end, so that users waiting outside the room can plan accordingly. For example, rather than indicating that "Room is currently in use", the display 110 may indicate that the conference room 100 is "Reserved by John Doe until 5:00 pm". As an example, if the conference room 100 is shown as currently scheduled, but no users 104 are detected in the conference room 100 (e.g., via the motion sensor 106), the conference room 100 may be released after a period of time to users waiting outside the conference room 100.

Referring to FIG. 1B, once the motion sensor 106 detects that there are no longer any users 104 remaining in the conference room 100, or after an amount of time has passed after users 104 are no longer detected in the conference room 100, the display 110 may indicate that the conference room 100 is unoccupied by showing that the "Room is free", as illustrated. However, by having access to scheduling information regarding the conference room 100, as described above, the computing device 102 may use the display 110 to provide additional information as well. For example, if a meeting ends early, and no users 104 are detected in the conference room 100 for a period of time, the conference room 100 may be released earlier than the scheduled end time. In addition, rather than indicating that the "Room is free", the computing device 102 may determine when the next scheduled meeting is and how long the room will remain free, for example, by indicating on the display 110 that the "Room is free until 3:00 pm" or "John Do has room reserved next from 3:00-5:00 pm". As an example, as the computing device 102 can be connected to other components in the conference room, such as projectors and lights, the other components can be powered down and put to sleep until the next scheduled meeting.

Figure 2A:
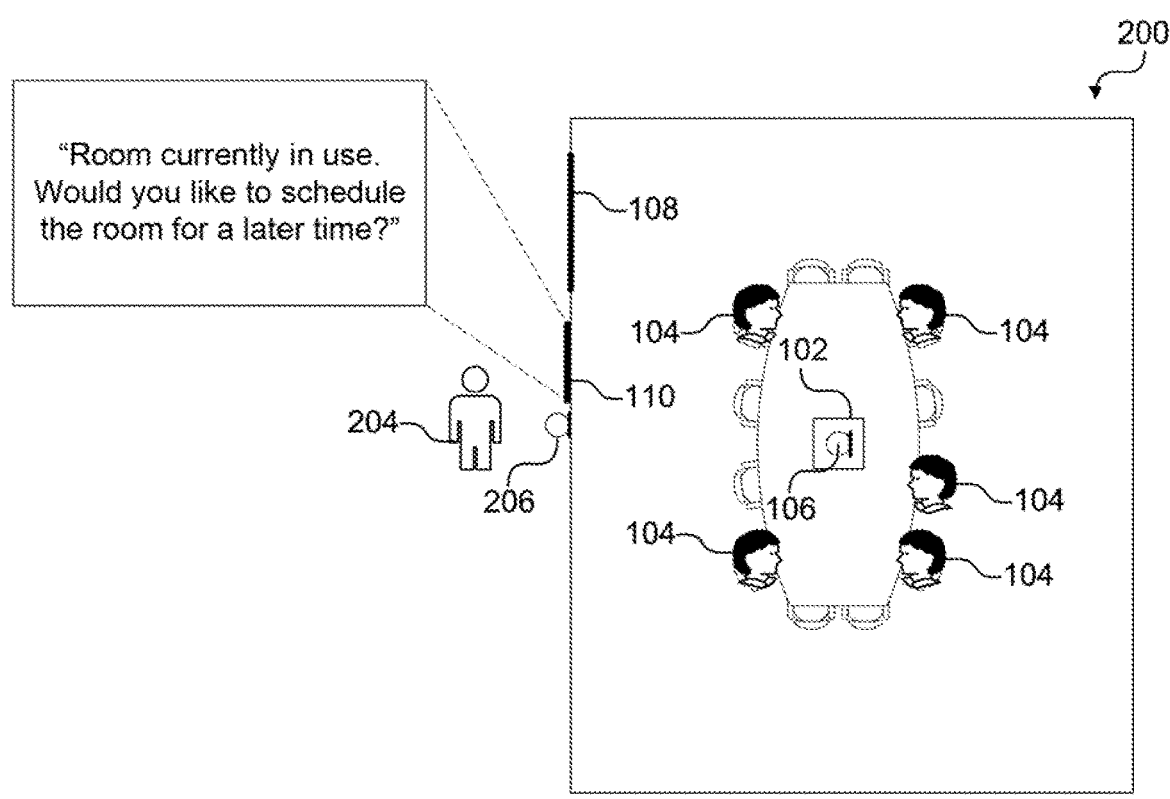
FIGS. 2A-B illustrate a conference room with the ability for users outside the conference room to interact with a display outside the conference room, according to an example.
Figure 2B:
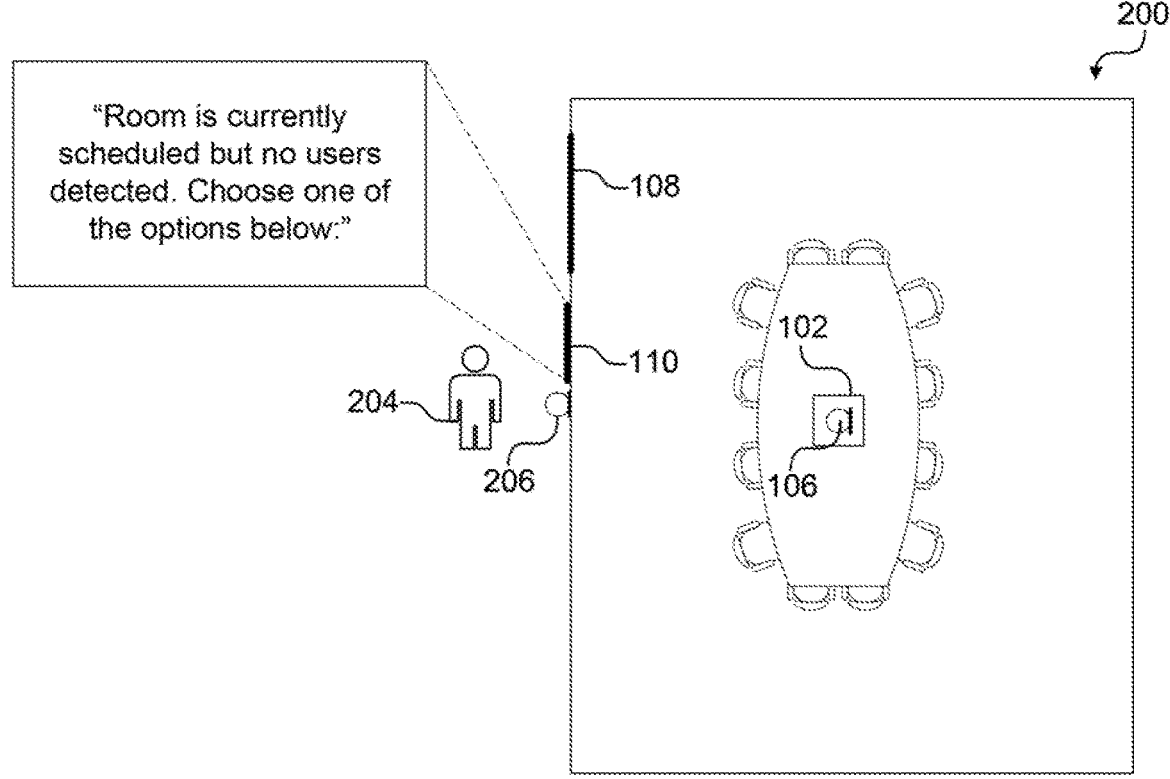

FIGS. 2A-B illustrate a conference room 200 with the ability for users 204 to interact with the display 110, in order to streamline utilization of the conference room 200, according to an example. As will be further described, non-intrusive communication from outside the conference room 200 may encourage more timely meetings and inform the waiting users 204 of meeting schedules. As an example, a motion sensor 206, such as a passive infrared (PIR) sensor, may be disposed next to the display 110 outside the conference room 200, in order to detect the presence of users 204 outside the conference room 200, next to the display 110. Similar to the motion sensor 106 and the display 110, the motion sensor 206 may be part of the system and connected to the computing device 102, in order to provide information about any users 204 detected outside the conference room 100. As an example, if a user 204 is detected by the motion sensor 206 in proximity to the display 110 outside the conference room 200, the computing device 102 may prompt, on the display 110, whether the user 204 is waiting to use the conference room 200, or would like to schedule the conference room 200 for a later time. The display 110 may include various forms of input, such as buttons or a touchscreen, in order for the user 204 to respond to the prompts on the display 110.

Referring to FIG. 2A, if users 204 are detected within proximity of the display 110 outside the conference room 200, and if users 104 are detected inside the conference room 200, the prompts shown on the display 110 may vary, depending on whether the users 104 detected inside the conference room 200 have scheduled to use the conference room 200, and are still within the time allotted. For example, similar to FIG. 1A, the computing device 102 may output to the display, "Room currently in use". However, upon detecting the user 204 outside the conference room 200, the display 110 may also prompt the user by asking whether the user 204 would like to schedule a future meeting in the conference room 200, as illustrated. By having access to the scheduling information, the user 204 may be able to select a later open time in order to use the conference room 200.

At times, meetings in the conference room 200 may run over the allotted time. For example, if time has lapsed for a scheduled meeting in the conference room, the users 104 in the conference room may be informed whether other users (e.g., users 204) are waiting outside the conference room 200 (e.g., in proximity to the display 110 outside the conference room, as detected by the motion sensor 206). As an example, the users 104 may be informed by the computing device 102 projecting such information from a projector in the conference room. As an example, if a meeting runs overtime in the conference room 200, and users 204 are waiting outside, the users 204 can press a button on the display 110. This button press can be sent to the computing device 102, and the computing device 102 can then notify the users 104 in the conference room 200 that people are waiting outside to use the conference room. As an example, such notification can be a text ticker projected from a projector, or a red flashing border on the projection screen.

Referring to FIG. 2B, if users 204 are detected within proximity of the display 110 outside the conference room 200, and if users are not detected inside the conference room 200, the prompts shown on the display 110 may vary, depending on whether the conference room 200 is currently scheduled for a meeting. For example, if the users 204 are waiting to use the conference room 200, and if the conference room 200 is currently scheduled for a meeting but users are not detected in the conference room 200, the computing device 102 may prompt via the display 110 to choose between temporarily utilizing the conference room 200 until users for the currently scheduled meeting arrive, or permanently utilizing the conference room 200 after a certain amount of time has elapsed, as illustrated.

Figure 3:
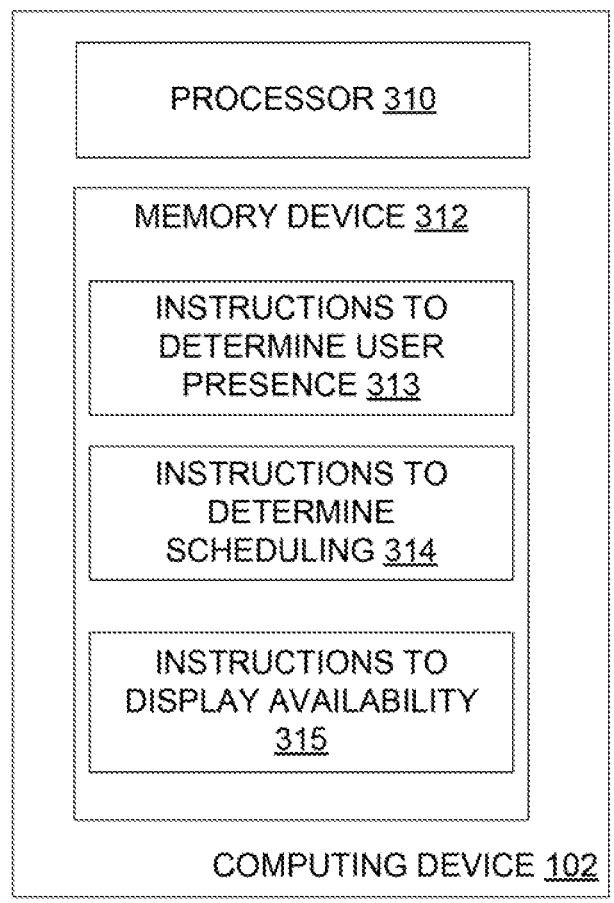
FIG. 3 is a block diagram depicting a memory device and a processor, according to one example.

FIG. 3 is a block diagram depicting a memory device 312 and a processor 310 of the computing device 102, according to an example. As an example of the computing device 102 performing its operations, the memory device 312 may include instructions 313-315 that are executable by the processor 310. Thus, memory device 312 can be said to store program instructions that, when executed by processor 310, implement the components of the computing device 102.

Memory device 312 represents generally any number of memory components capable of storing instructions that can be executed by processor 310. Memory device 312 is non-transitory in the sense that it does not encompass a transitory signal but instead is made up of at least one memory component configured to store the relevant instructions. As a result, the memory device 312 may be a non-transitory computer-readable storage medium. Memory device 312 may be implemented in a single device or distributed across devices. Likewise, processor 310 represents any number of processors capable of executing instructions stored by memory device 312. Processor 310 may be integrated in a single device or distributed across devices. Further, memory device 312 may be fully or partially integrated in the same device as processor 310, or it may be separate but accessible to that device and processor 310.

In one example, the program instructions can be part of an installation package that when installed can be executed by processor 310 to implement the components of the computing device 102. In this case, memory device 312 may be a portable medium such as a CD, DVD, or flash drive or a memory maintained by a server from which the installation package can be downloaded and installed. In another example, the program instructions may be part of an application or applications already installed. Here, memory device 312 can include integrated memory such as a hard drive, solid state drive, or the like.

In FIG. 3, the executable program instructions stored in the memory device 312 include instructions to determine user presence 313, instructions to determine scheduling 314, and instructions to display availability 315. Instructions to determine user presence 313 represent program instructions that when executed by the processor 310 cause a motion sensor (e.g., motion sensor 106) to determine occupancy throughout a conference room (e.g., conference room 100 or conference room 200). Instructions to determine scheduling 314 represent program instructions that when executed by the processor 310 cause the computing device 102 to access scheduling information regarding the conference room. Instructions to display availability 315 represent program instructions that when executed by the processor 310 cause the computing device 102 to show on a display outside the conference room (e.g., display 110) availability of the conference room. As an example, the availability of the conference room may be based on whether users are detected within the conference room and/or whether the room is currently scheduled for a meeting.

Figure 4:
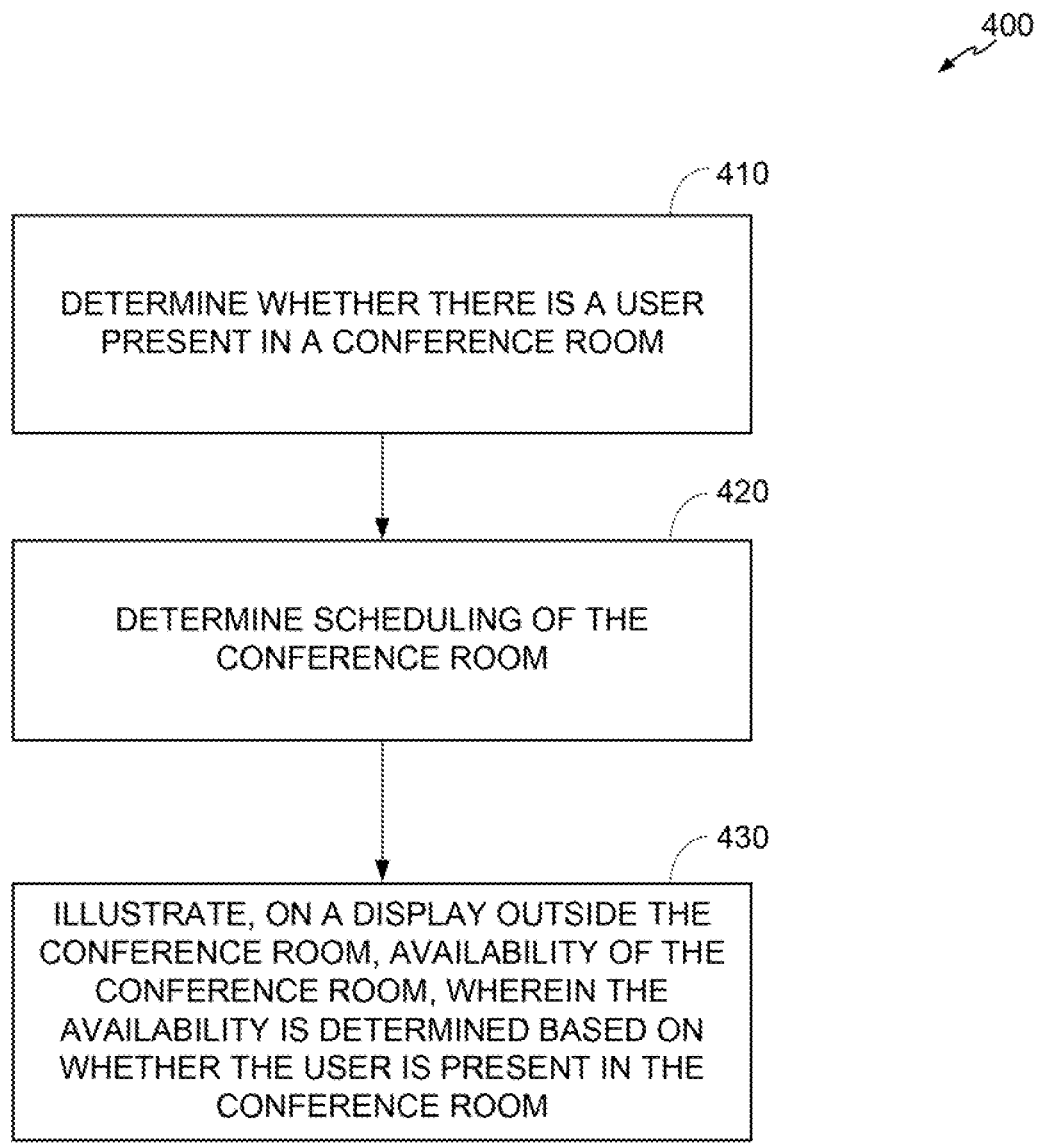
FIG. 4 is a flow diagram in accordance with an example of the present disclosure.

FIG. 4 is a flow diagram 400 of steps taken to implement a method for a computing device to determine availability of a conference room. In discussing FIG. 4, reference may be made to the example scenarios illustrated in FIGS. 1A-B and/or 2A-B. Such reference is made to provide contextual examples and not to limit the manner in which the method depicted by FIG. 4 may be implemented.

At 410, the computing device may determine whether there is a first user present in the conference room. For example, referring back to FIGS. 2A-B, motion sensor 106 may be used to determine occupancy throughout the conference room 200.

At 420, the computing device may determine scheduling of the conference room. For example, by having access to scheduling information of the conference room, the computing device may be able to make decisions regarding the availability of the conference room.

At 430, the computing device may illustrate, on a display outside the conference room, availability of the conference room, which is accessible by users that may be waiting outside the conference room (e.g., users 204). As an example, the availability may be determined based on whether the first user is present in the conference room and/or whether the conference room is currently scheduled.

In addition to determining user presence within the conference room, the computing device may utilize another motion sensor outside the conference room to detect whether a second user is present in proximity to the display outside the conference room. If a second user is detected outside the conference room, non-intrusive communications may be exchanged between users inside and outside the conference room (i.e., the first and second user), in order to encourage more timely meetings and inform waiting users of meeting schedules.

Although the flow diagram of FIG. 4 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
   receiving, at a computing device, signaling from a first sensor in communication with the computing device indicating a presence or absence of a first user in a conference room;
   receiving signaling from a second sensor in communication with the computing device indicating a presence or absence of a second user outside the conference room;
   in response to determining the second user is present outside the conference room, and the first user is present in the conference room:
      providing a notification, via the computing device, to the first user that the second user is outside the conference room and of a remaining reservation time for the conference room;
      illustrating, on a display in communication with the computing device and located outside the conference room, an unavailable message, a usage schedule for the conference room, and a present occupancy throughout the conference room; and
      providing a prompt via the display to the second user to schedule the conference room; and
   in response to determining the second user is present outside the conference room and the first user is not present in the conference room:
      illustrating on the display an available message, the usage schedule for the conference room, and a zero conference room occupancy;
      prompting the second user, via the display, to choose between temporarily utilizing the conference room until users for a scheduled meeting arrive, or permanently utilizing the room after a certain amount of time has elapsed; and
      the computing device placing itself in a low power state and instructing a conference room component in communication with the computing device to power off until the signaling from the first sensor indicates motion in the conference room.

2. The method of claim 1, wherein receiving signaling from the second sensor indicating a presence or absence of a second user outside the conference room comprises determining whether the second user is within a proximity to the display outside the conference room.

3. The method of claim 2, wherein when the second user is detected in proximity to the display outside the conference room, providing a prompt via the display to the second user requesting confirmation that the second user is waiting to use the conference room.

4. The method of claim 3, further comprising determining the second user is waiting to use the conference room based upon input received on the display in response to the prompt, and providing a notification to the first user via the computing device that the second user detected in proximity to the display outside the conference room is waiting to use the conference room.

5. The method of claim 3, comprising receiving input via the display in response to the prompt via the display to the second user to schedule the conference room, the input comprising input data representative of a scheduled future meeting in the conference room.

6. The method of claim 1, wherein when time has lapsed for a scheduled meeting in the conference room, informing the first user, via the computing device, whether the second user is waiting in proximity to the display outside the conference room.

7. A system comprising:
a first motion sensor disposed within a conference room;
a second motion sensor disposed outside of the conference room;
a display disposed outside the conference room; and
a computing device, wherein the first motion sensor, the second motion sensor, and the display are connected to the computing device, and wherein the computing device is to:
determine, via the first motion sensor, whether there is a first user present in the conference room;
determine, via the second motion sensor, whether there is a second user present outside the conference room;
determine scheduling of the conference room; and
based on the presence or absence of the first user in the conference room, the second user outside the conference room, or both:
provide a notification, via the computing device, to the first user, the presence or absence of the second user outside the conference room and a notification of a remaining reservation time for the conference room;
illustrate, on the display outside the conference room, an availability message of the conference room, a usage schedule for the conference room, and a present occupancy throughout the conference room, wherein the availability is determined based on whether the conference room is currently scheduled;
provide a prompt via the display to the second user to schedule the conference room; and
place itself into a low power state and instruct a conference room component to power off when the first sensor indicates a lack of motion in the conference room and power on when the first sensor indicates motion in the conference room.

8. The system of claim 7, further comprising the computing device to illustrate on the display outside the conference room a prompt to choose between temporarily utilizing the conference room until users for a scheduled meeting arrive or permanently utilizing the conference room after a certain amount of time has elapsed.

9. The system of claim 7, comprising the second motion sensor connected to the computing device and disposed next to the display outside the conference room, wherein the computing device is to determine, via the second motion sensor, whether there is a second user present in proximity to the display outside the conference room.

10. The system of claim 9, wherein when the second user is present in proximity to the display outside the conference room, the computing device is to prompt, on the display, a request for input regarding whether the second user is waiting to use the conference room.

11. The system of claim 9, wherein when the second user is present in proximity to the display outside the conference room, the computing device is to prompt the second user to schedule a future meeting in the conference room via the display outside the conference room.

12. The system of claim 7, wherein when time has lapsed for a scheduled meeting in the conference room, informing the first user present in the conference room that the second user is outside the conference room.

13. A non-transitory computer-readable storage medium comprising programming instructions which, when executed by a processor, to cause the processor to:
receive signaling from a first sensor indicating a presence or absence of a first user in a conference room;
receive signaling from a second sensor outside the conference room indicating a presence or absence of a second user outside the conference room;
in response to determining the second user is present outside the conference room, and the first user is present in the conference room:
provide a notification to the first user that the second user is outside the conference room and a notification of a remaining reservation time for the conference room;
illustrate, on a display outside the conference room, an unavailable message, a usage schedule for the conference room, and a present occupancy throughout the conference room;
determine scheduling of the conference room;
provide a prompt via the display outside the conference room, to the second user to schedule the conference room; and
in response to determining the second user is present outside the conference room and the first user is not present in the conference room:
illustrate on the display an available message, the usage schedule for the conference room, and a zero conference room occupancy;
prompting the second user, via the display, to choose between temporarily utilizing the conference room until users for a scheduled meeting arrive, or permanently utilizing the room after a certain amount of time has elapsed; and
instruct a computing device to place itself in a low power state and instruct a conference room component in communication with the computing device to power off until the signaling from the first sensor indicates motion in the conference room.

14. The non-transitory computer-readable storage medium of claim 13, comprising instructions which, when executed by the processor, to cause the processor to:
illustrate on the display outside the conference room color notifications indicating the presence or absence of the first user in the conference room.

* * * * *